(12) United States Patent
Ehrman

(10) Patent No.: US 12,073,328 B2
(45) Date of Patent: Aug. 27, 2024

(54) INTEGRATING A MEMORY LAYER IN A NEURAL NETWORK FOR ONE-SHOT LEARNING

(71) Applicant: GSI Technology Inc., Sunnyvale, CA (US)

(72) Inventor: Eli Ehrman, Beit Shemesh (IL)

(73) Assignee: GSI Technology Inc., Sunnyvale, CA (US)

(*) Notice: Subject to any disclaimer, the term of this patent is extended or adjusted under 35 U.S.C. 154(b) by 881 days.

(21) Appl. No.: 16/055,103

(22) Filed: Aug. 5, 2018

(65) Prior Publication Data

US 2018/0341862 A1 Nov. 29, 2018

Related U.S. Application Data

(63) Continuation-in-part of application No. 15/648,475, filed on Jul. 13, 2017, now Pat. No. 10,929,751.

(60) Provisional application No. 62/541,717, filed on Aug. 6, 2017, provisional application No. 62/446,861, filed on Jan. 17, 2017, provisional application No. 62/364,883, filed on Jul. 21, 2016, provisional application No. 62/363,270, filed on Jul. 17, 2016.

(51) Int. Cl.
| | |
|---|---|
| *G06N 3/04* | (2023.01) |
| *G06N 3/042* | (2023.01) |
| *G06N 3/063* | (2023.01) |
| *G06N 3/084* | (2023.01) |
| *G06N 20/00* | (2019.01) |

(52) U.S. Cl.
CPC .............. *G06N 3/084* (2013.01); *G06N 3/04* (2013.01); *G06N 3/042* (2023.01); *G06N 3/063* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 4,546,456 A | 10/1985 | Buie | |
| 5,014,327 A | 5/1991 | Potter et al. | |

(Continued)

OTHER PUBLICATIONS

Wohlhart, Optimizing 1-Nearest Prototype Classifiers, 2013 IEEE Conference on Computer Vision and Pattern Recognition (Year: 2013).*

(Continued)

*Primary Examiner* — Aniss Chad
*Assistant Examiner* — Shien Ming Chou
(74) *Attorney, Agent, or Firm* — HEIDI BRUN ASSOCIATES LTD.

(57) ABSTRACT

A method for machine learning includes extracting features from a training set of inputs, wherein each input generates a feature set and each the feature set forms a neural network key. The method includes arranging the keys in an in-memory computational layer such that the distance between any pair of keys corresponding to similar inputs is as close as possible while keys for a pair of dissimilar inputs have differing values as far apart as possible, wherein each of the keys has a fixed size. The method also includes searching through the dataset using an in-memory K-nearest neighbor unit to find K keys similar to a query key, the searching occurring in a constant amount of time as a function of the fixed size and irrespective of a size of the dataset.

8 Claims, 2 Drawing Sheets

(56) References Cited

U.S. PATENT DOCUMENTS

| | | | |
|---|---|---|---|
| 5,649,181 | A | 7/1997 | French |
| 5,799,300 | A | 8/1998 | Agrawal et al. |
| 5,983,224 | A | 11/1999 | Singh et al. |
| 8,099,380 | B1 * | 1/2012 | Shahabi ............... H04W 4/023 706/62 |
| 8,238,173 | B2 | 8/2012 | Akerib et al. |
| 8,244,789 | B1 | 8/2012 | Langhammer |
| 9,418,719 | B2 | 8/2016 | Akerib et al. |
| 9,558,812 | B2 | 1/2017 | Akerib |
| 10,153,042 | B2 | 12/2018 | Ehrman et al. |
| 11,210,605 | B1 | 12/2021 | Gupta et al. |
| 2007/0250522 | A1 | 10/2007 | Perrizo |
| 2008/0306944 | A1 * | 12/2008 | Aparicio, IV ......... G06F 18/10 |
| 2011/0182119 | A1 | 7/2011 | Strasser et al. |
| 2015/0120987 | A1 | 4/2015 | Wheeler |
| 2015/0131383 | A1 | 5/2015 | Akerib et al. |
| 2017/0277659 | A1 | 9/2017 | Akerib et al. |
| 2018/0081566 | A1 | 1/2018 | Ehrman et al. |
| 2018/0157970 | A1 * | 6/2018 | Henry .................... G06F 12/08 |

OTHER PUBLICATIONS

Chatzimilioudis, Distributed In-Memory Processing of All k Nearest Neighbor Queries, IEEE Transaction on Knowledge and Data Engineering, Apr. 2016 (Year: 2016).*

Whatis.com, data set, 2016 (Year: 2016).*

Rinkus, A Cortex-inspired Associative Memory with O(1) Time Complexity Learning, Recall and Recognition of Sequences, Brandeis University, 2006 (Year: 2006).*

Canal, Memory Structure, Department d'Arquitectura de Computadors, Universitat Politecnica de Catalunya, Jul. 6, 2016 (Year: 2016).*

ICS33 lecture note, The Complexity of Python Operators/Functions—ICS UCI, Donald Bren School of Information & Computer Sciences, 2014 (Year: 2014).*

BIONB330 reading material, Associative Memory, Cornell University, 2013 (Year: 2013).*

Zhang, k-nearest neighbors associative memory model for face recognition, AI 2005, LNAI 3809, pp. 540-549, 2005 (Year: 2005).*

Wohlhart, Optimizing 1-Nearest Prototype Classifiers, 2013 IEEE Conference on Computer Vision and Pattern Recognition. 2013 (Year: 2013).*

International Search Report for corresponding PCT application PCT/IB2017/54233 mailed on Jan. 12, 2018.

Miller et al. "Key-value memory networks for directly reading documents." arXiv preparing arXiv: 1606.03126.

Davide Piombo et al., "Analog soft max circuit with dynamic gain control", Research in Microelectronics and Electronics, 2005 PhD. vol. 1, IEEE.

* cited by examiner

INTEGRATING A MEMORY LAYER IN A NEURAL NETWORK FOR ONE-SHOT LEARNING

CROSS REFERENCE TO RELATED APPLICATIONS

This application claims priority and benefit from U.S. provisional patent application 62/541,717, filed Aug. 6, 2017, which is incorporated herein by reference.

This application is a continuation-in-part application of U.S. patent application Ser. No. 15/648,475, filed Jul. 13, 2017, which claims priority and benefit from U.S. provisional patent applications 62/363,270, filed Jul. 17, 2016, 62/364,883, filed Jul. 21, 2016, and 62/446,861 filed Jan. 17, 2017, all of which are incorporated herein by reference.

FIELD OF THE INVENTION

The present invention relates to neural networks generally and to neural networks with dynamic memory in particular.

BACKGROUND OF THE INVENTION

Machine learning using Neural Networks has achieved tremendous success in the last few years. However, one of the key challenges for Neural Networks is that a very large number of examples, on the order of tens of thousands, are required to achieve this learning capability. These training examples must be labeled and curated by human beings; a very labor-intensive task. Recently it has been shown that integrating Dynamic Memory with the more traditional Neural Network can drastically reduce the number of labeled examples required per unique label class. This is referred to by practitioners as one-shot (or zero-shot and low-shot) learning.

When using dynamic memory, the layers that comprise the network are not only neuron-like layers. There are also one or more layers that work as a memory for the network, using search, lookup and response-integration techniques that ultimately provide an output for each input applied to the network. However, searching through a memory is computationally expensive considering the throughput required from machine learning networks and the vast amounts of data involved.

SUMMARY OF THE PRESENT INVENTION

There is therefore provided, in accordance with a preferred embodiment of the present invention, a method for machine learning. The method includes extracting features from a training set of inputs, wherein each input generates a feature set and each the feature set forms a neural network key. The method includes arranging the keys in an in-memory computational layer such that the distance between any pair of keys corresponding to similar inputs is as close as possible while keys for a pair of dissimilar inputs have differing values as far apart as possible, wherein each of the keys has a fixed size. The method also includes searching through the dataset using an in-memory K-nearest neighbor unit to find K keys similar to a query key, the searching occurring in a constant amount of time as a function of the fixed size and irrespective of a size of the dataset.

Moreover, in accordance with a preferred embodiment of the present invention, the method includes implementing a SoftMax operation on the K keys to produce a query result.

Further, in accordance with a preferred embodiment of the present invention, the distance is defined by the type of machine learning operation to be performed on the K keys.

Still further, in accordance with a preferred embodiment of the present invention, the machine learning operation is one of vector generation and classification.

There is also provided, in accordance with a preferred embodiment of the present invention, a method for machine learning which includes generating training feature sets that capture similarities between pairs of training inputs associated with the same object, storing the feature sets in an in-memory computational layer, wherein each set of the feature sets has a fixed size, and searching through the feature sets in a constant amount of time as a function of the fixed size and irrespective of the number of the feature sets.

Moreover, in accordance with a preferred embodiment of the present invention, the method includes implementing a SoftMax operation on the K keys to produce a query result.

Further, in accordance with a preferred embodiment of the present invention, the distance is defined by the type of machine learning operation to be performed on the K keys.

Still further, in accordance with a preferred embodiment of the present invention, the machine learning operation is one of vector generation and classification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
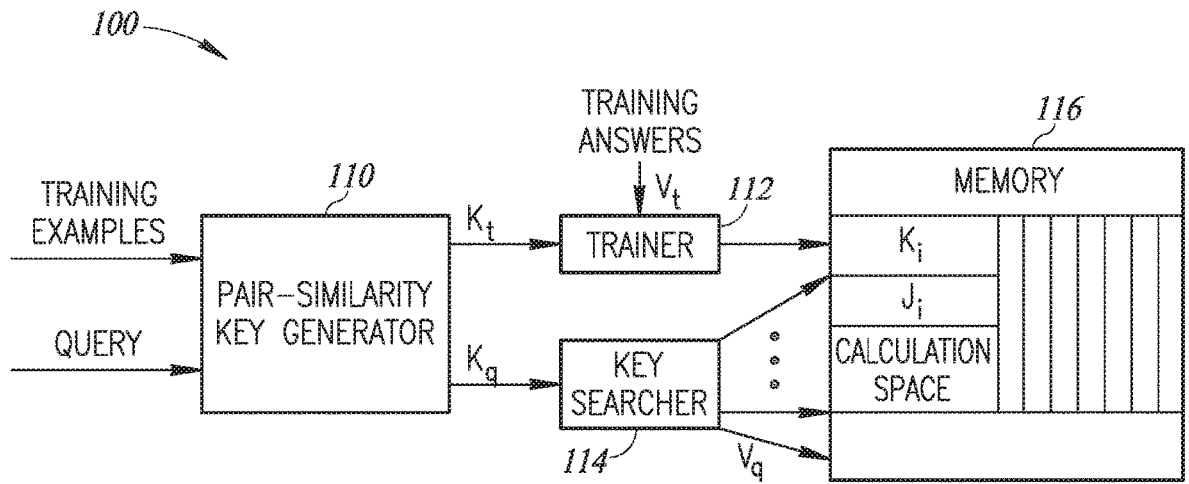
FIG. 1 is a schematic illustration of a pair similarity network, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that searching through a memory may be effective if the data stored therein is not the training data itself with the labeled output but a dataset which captures similarities between pairs of training inputs associated with the same labeled output. This dataset may enable neural networks to learn to classify or predict input examples with relatively few examples. Moreover, Applicant has realized that using an associative processor/computational memory unit such as those described in U.S. patent application Ser. No. 15/648,475, filed Jul. 13, 2017, and issued as U.S. Pat. No. 10,929,751 and Feb. 23, 2021, incorporated herein by reference, may provide a constant time search irrespective of the size of the dataset and irrespective of the sparseness of the dataset. As a result, the present invention may be applied to entirely new fields for which, until now, trained data examples have been too sparse for any type of machine learning to make meaningful progress.

In the present invention, the neural network, as a whole, functions the way any neural network does. It is trained by supplying a number of training examples with pre-determined output (training). Once trained, similar examples, whose output is not known, are supplied as input and the network provides an output in each case (inference). However, in the present invention, there is a memory layer which captures similarities between pairs of training inputs associated with the same labeled output.

Reference is now made to FIG. 1, which illustrates a pair-similarity network 100, constructed and operative in accordance with a preferred embodiment of the present invention. Pair-similarity network 100 may comprise a pair-similarity key generator 110, a trainer 112, a key searcher 114 and a memory 116. In one implementation, memory 116 and key searcher 114 may be implemented as an associative processor, such that key searcher 114 may comprise a row decoder activating rows of an associative memory to implement the key search, as taught in U.S. Pat. No. 8,238,173 (entitled "USING STORAGE CELLS TO PERFORM COMPUTATION"); U.S. patent application Ser. No. 14/588,419, filed on Jan. 1, 2015 issued as U.S. Pat. No. 10,832,746 on Nov. 10, 2020, (entitled "NON-VOLATILE IN-MEMORY COMPUTING DEVICE"); U.S. patent application Ser. No. 14/555,638 filed on Nov. 27, 2014 issued as U.S. Pat. No. 9,418,719 on Aug. 16, 2016, (entitled "IN-MEMORY COMPUTATIONAL DEVICE"); U.S. Pat. No. 9,558,812 (entitled "SRAM MULTI-CELL OPERATIONS") and U.S. patent application Ser. No. 15/650,935 filed on Jul. 16, 2017 issued as U.S. Pat. No. 10,153,042 on Dec. 11, 2018, (entitled "IN-MEMORY COMPUTATIONAL DEVICE WITH BIT LINE PROCESSORS") all assigned to the common assignee of the present invention and incorporated herein by reference. Key generator 110 may extract features of the input data and may produce a multi-value key $k_i$ that represents the important features of the input, as described in more detail hereinbelow. Memory 116 may be a searchable memory array which may hold a large number of records, where each record may comprise multi-value key $k_i$ and a related output value $v_i$. As mentioned above, memory 116 may be an associative memory and may store each record in a column of the memory. As described in the patents listed above, operations on memory 116 may be implemented by accessing multiple rows at a time, thereby performing the same operation on all records at one time.

Key generator 110 may comprise one or more neural network layers, such as a single Fully Connected layer (essentially a matrix multiply of the input values), multiple such layers, Convolutional Layers(s) etc. These may typically include Sigmoid or RELU layers, Maxpool layers, etc., as is known in the art. However, key generator 110 does not learn to produce the output. Instead, key generator 110 may only learn to produce appropriately-valued keys, as described in more detail hereinbelow, to be stored in memory 116.

Key generator 110 may be partially or fully implemented with an associative memory/computational memory device, such as those described in U.S. patent Publication US 2017/0277659, issued as U.S. Pat. No. 10,997,275 on May 4, 2021, entitled "IN MEMORY MATRIX MULTIPLICATION AND ITS USAGE IN NEURAL NETWORKS", assigned to the common assignee of the present invention and incorporated herein by reference, which may provide a linear or event constant complexity for the matrix multiplication part of a neural network computation. Systems as described in U.S. patent application Ser. No. 15/784,152 filed Oct. 15, 2017, issued as U.S. Pat. No. 10,949,766 on Mar. 16, 2021, entitled "PRECISE EXPONENT AND EXACT SOFTMAX COMPUTATION", assigned to the common assignee of the present invention and incorporated herein by reference, may provide a constant complexity for the nonlinear part of an RNN computation in both training and inference phases.

Key generator 110 may initially undergo a training phase with T training examples, where, as described hereinbelow, T may have considerably fewer examples than in the prior art. Each training example $t_i$ may comprise input data $p_i$, and an expected output value, $v_i$. For example, the user may provide training examples $t_i$, each of which may comprise an image and a label associated with that image. Key generator 110 may initially extract features from input data $p_i$, according to any suitable feature extraction method.

Key generator 110 may then train its internal neural network with the features of each training example $t_i$, typically adjusting the weights of its internal neural network layers so that they generate output value $v_i$ when given the features associated with input data $p_i$. Key generator 110 may produce a key $k_i$ for training example $t_i$ and may provide it to trainer 112.

Trainer 112 may create a record $r_i$ for training example $t_i$ which it may then store in searchable memory 116, such as in the ith column of an associative memory array. The record $r_i$ may comprise key $k_i$ and output value $v_i$.

Once training has finished, the user may provide a new, untrained or testing example, in the form of a query, q. Query q may comprise data in the same form as the training examples $t_i$. The user may provide query q to key generator 110 which may create a query key $k_q$.

Figure 2:
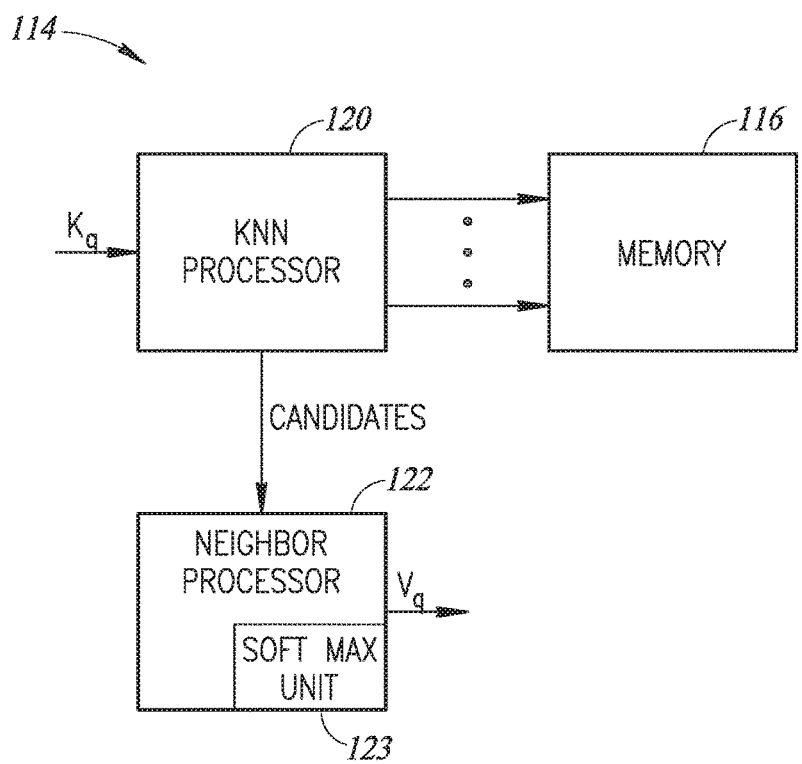
FIG. 2 is a block diagram illustration of a key searcher forming part of the network of FIG. 1.

Key searcher 114 may compare query key $k_q$ to all the records in memory 116 and may select a set of K nearest neighbors (KNN). To do this and as shown in FIG. 2 to which reference is now made, key searcher 114 may comprise a KNN processor 120 operating on memory 114, such as the associative processor described in U.S. patent application Ser. No. 15/648,475 filed Jul. 13, 2017, issued as U.S. Pat. No. 10,929,751 on Feb. 23, 2021, entitled "FINDING K EXTREME VALUES IN CONSTANT PROCESSING TIME", assigned to the common assignee of the present invention and incorporated herein by reference. Such a processor may provide a constant complexity for the computation of a K-nearest neighbor (KNN) on a trained neural network. The constant complexity is a function of the size of each record, such as $r_i$, rather than the size of the dataset. Key searcher 114 may also comprise a neighbor processor 122.

A close neighbor is defined herein as a record whose key is similar to $k_q$. For example, the similarity may be defined as the cosine similarity (the angle between unit-length vectors), Euclidean distance or L1-norm distance which may produce the highest or close to highest value.

Neighbor processor 122 may process the keys with the K highest similarities (i.e. the K closest neighbors) as generated by key searcher 114 and may produce a single value $v_q$ from them. For example, neighbor processor 122 may implement a majority vote among the neighbors where the closer neighbors' votes are given a greater weight. This may be a weighted average of the values of the K neighbors.

Alternatively, neighbor processor 122 may generate its output $v_q$ as a function of the type of operation, classification or vector generation, that pair-similarity network 100 may perform. One type of output $v_q$, used normally for classification, aims to achieve a single (or "one-shot") result. In other words, a single record will be chosen from among all of the key-result data. Neighbor processor 122 may achieve this result with a SoftMax unit 123 which may implement the SoftMax operation on each of the records $r_i$. Softmax unit 123 may generate a SoftMax value $s_i$ which may be considered a probability that the ith record should be selected as the answer. The record with the largest SoftMax value si may be chosen as the result $v_q$.

In a further alternative embodiment, the K outputs v are treated as a vector of values, positioning the result as a location within a K-dimensional space.

In accordance with a preferred embodiment of the present invention, the desired type of output may affect how key generator 110 may generate keys $k_i$. In the classification case, $v_q$ may be a single scalar (integer) number while in the vector generation case, $\overline{v}_q$ may be a vector of (usually floating point) numbers. The treatment of these two cases is somewhat different as will be described below.

In accordance with the present invention, in the classification case, two records may either have the same value v or differing values $v_1$ and $v_2$. In those cases, two records (1 and 2) that have different values for v should have key values ($k_1$ and $k_2$) as dis-similar as possible. For example, the cosine distance may be close to 0.0 or below it. On the other hand, two records 1 and 2 with the same value v should have key values $k_1$ and $k_2$ as close as possible (i.e. the cosine distance between them should approach 1.0).

In accordance with the present invention, for the vector generation case, the two records whose values $v_1$ and $v_2$ are close should have keys $k_1$ and $k_2$ that are close. Otherwise they should be different. To produce this, the cosine distance between $v_1$ and $v_2$ should be the same as the cosine distance between $k_1$ and $k_2$.

It will be appreciated that key generator 110, which comprises neural network layers, may be trained differently than prior art feature extractors. In classical machine learning, these layers are required to learn to produce the output itself. However, in the present invention, this is the task of memory 116.

Instead, in the present invention, the goal of key generator 110 is not to learn to produce the results v but rather to arrange keys such that the distance between them corresponds to the distance required for the type of operation to be performed. For classification, the records with the same value v have keys k which are as close as possible while those records with differing values have keys which are as far apart as possible. For vector generation, on the other hand, the vector keys must be separated from each other with generally the same amount of separation as their values are separated. According to the present invention, it does not matter where the keys are located; what matters is the distance between them, within a K-dimensional space.

Figure 3:
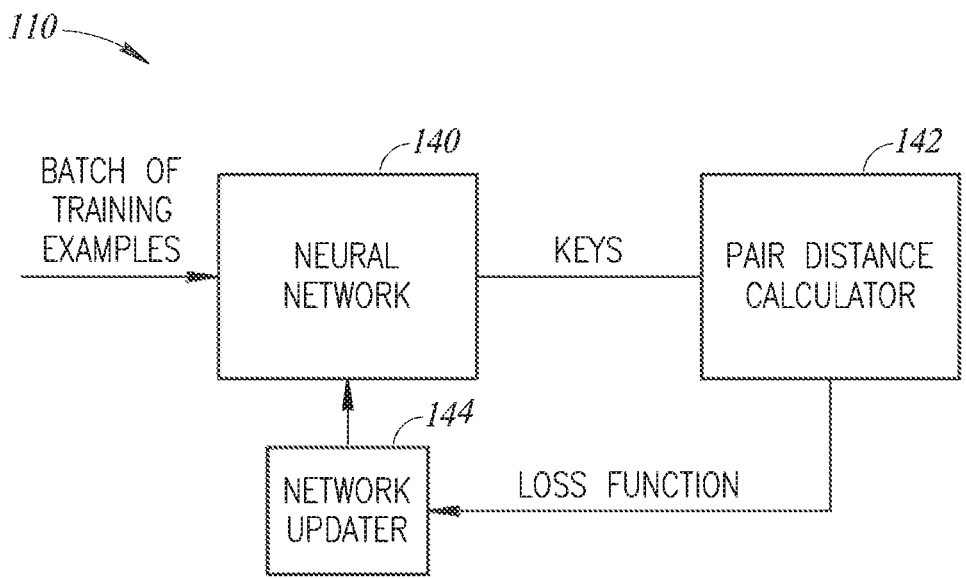
FIG. 3 is a block diagram illustration of a key generator forming part of the network of FIG. 1.
Figure 4:
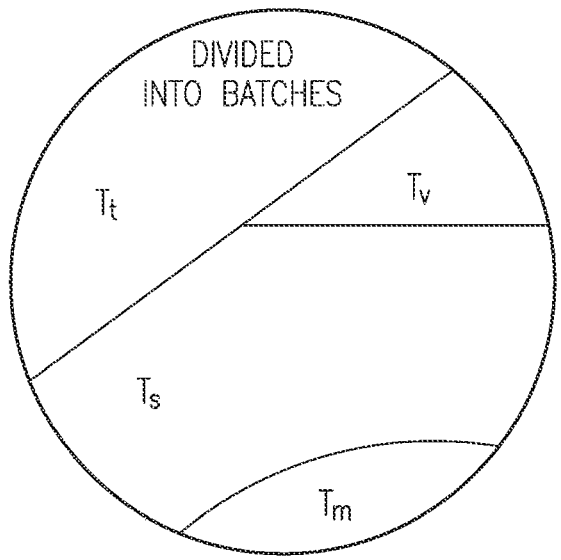
FIG. 4 is a schematic illustration of the division of data to be used to train the network of FIG. 1.

Reference is now made to FIG. 3, which illustrates the elements of pair-similarity key generator 110, and to FIG. 4, which illustrates training set T to be used to train key generator 110. In accordance with a preferred embodiment of the present invention, key generator 110 may comprise a neural network 140, a pair-distance calculator 142 and a network updater 144. Neural network 140 may be any suitable neural network having multiple network layers. In accordance with a preferred embodiment of the present invention, training set T may be divided into 4 subsets, $T_t$ to train neural network 140, $T_v$ to validate the training; $T_s$, to test trained network 140 and $T_m$, to define the keys once network 140 is fully trained.

Key generator 110 may initially train neural network 140 on multiple batches of b randomly selected training examples from training subset $T_t$. For each batch, all the training examples of the batch are passed through the untrained or partially-trained neural network 140. This produces a set of keys kb that are not yet correct. In standard neural network training, the keys kb are used to generate gradients of required change for the weights of the neurons and then at the end of each batch the gradients are used to update weights in the neural network. Training proceeds by repeating this process over a specified number of batches or until a target accuracy is achieved.

In the present invention, pair distance calculator 142 may select a pair of test examples and their resultant keys from test subset $T_s$ at random. Pair distance calculator 142 may calculate the distance between the two keys (cosine or some other) and may compare the resultant distance to the desired distance as defined in the preceding paragraphs. The resultant difference between the desired and the actual distance may be the error or loss function that pair distance calculator 142 may return to neural network 140.

Pair distance calculator 142 may select up to a maximum of $b^2$ pairs from test subset $T_s$ and may provide their associated loss values to neural network 140 which, in turn, may adjust and back-propagate the error through its network to generate a new set of weights which produce lower error/loss values.

It will be appreciated that the present invention may generate the loss by comparing the distance between random pairings within the batch rather than comparing the output of individual records to their individually desired values, as in the prior art. In other words, it is by comparing the partially-trained distances between pairs to the desired distance that the network is trained.

Once the errors or losses are small enough and/or once all the training examples of subset $T_t$ have been used, key generator 110 may run subset $T_v$ through now trained neural network 140, to look for such artifacts as overfitting. Overfitting arises when a network learns to predict expected values for the training examples in a way that takes account of those specific examples without generalizing appropriately. This ailment is detected when the error values for the training examples in training subset $T_t$ diverge significantly from the examples in validation subset $T_v$. To use this method, the examples in validation subset $T_v$ are never used to generate any updates of the weights in the network.

Once neural network 140 is validated, key generator 110 may run the test subset $T_s$ through now trained neural network 140, to get a final evaluation of the success of the architecture and its training.

Once neural network 140 is properly trained, key generator 110 may now apply all the examples in memory subset $T_m$ to neural network 140 without further learning. Key generator 110 may place the keys produced by these inputs into memory 116 together with the values provided for them. It will be appreciated that the keys associated with memory subset $T_m$ may be inserted into the memory alone or together with the keys from training subset $T_t$.

It will be appreciated that memory subset $T_m$ is not used during any part of the training process. Instead, memory subset $T_m$ may contain classes or ranges of values that are entirely absent from the examples in training subset $T_t$. For a standard neural network architecture, such a subset would result in 100% failure because the trained network has not received any information about the values to expect for $T_m$. However, in the present invention, if a new query is introduced without a label, but is an example of a class only present in $T_m$, the correct output will be quickly produced.

For example, $T_t$, $T_v$ and $T_s$ may be different subsets of the images in the 10,000 image categories of the ImageNet image database and they may produce neural network 140 that can map any image to a vector of values. Memory subset $T_m$ may be a one or two photos of buildings in Paris (Louvre, Eiffel tower etc.), where each building may be a new class unknown in the original training set. Running the small memory subset $T_m$ through neural network 140 may provide sufficient information to later classify a new photo of some unknown building in Paris. The similarity search may find the closest example from memory subset $T_m$ and may return a correct labeling of the new photo.

It will be appreciated that this ability to provide the correct output even for input the likes of which were never included in the original training is outstanding in another way, too. Neural networks are famous for requiring tremendous quantities of data. In many of the classic datasets that Machine Learning has succeeded with so spectacularly, there are many thousands of examples for each class the network is expected to learn. The present invention, which can search memory 116 in constant time (as a function of the size of each record $r_i$), new queries may be correctly classified quickly and using just a small handful of results.

It will be appreciated that the scope of this technique is as wide as is Machine Learning. Literally, every single configuration currently in use, including Fully Connected Networks, Convolutional Networks, Recurrent Networks (such as LSTM), Generative Adversarial Networks, Neural Turing Machines, can be enhanced, simplified and extended using a memory layer as described hereinabove. It can be applied to all fields including image analysis, video and action analysis, speech recognition, Natural Language Processing, Artificial Conversational Entities (chatbots), game playing systems, artificial reasoning, medical intelligence, cyber security, Robotics and so on.

The configuration described hereinabove assumes that the feature extraction component (key generator 110) receives the input data and the searchable memory 116 produces the final output. However, it is also possible for the memory layer to be inserted in an initial or middle position where the output of the memory layer feeds into further feature extraction layers.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for machine learning, the method comprising:
    extracting features from a training set of inputs, wherein each input generates a feature set and each said feature set forms a key for a key-value pair;
    using a neural network, arranging a dataset of said keys such that a distance between any two keys corresponding to two similar inputs is smaller than a distance between any two keys corresponding to two dissimilar inputs, wherein each of said keys has a fixed size;
    storing said dataset in columns of an associative memory array; and
    activating multiple rows of said associative memory array to implement a K-nearest neighbor processor operating in said columns of said associative memory array storing said dataset of keys to find K keys similar to a query key, said K-nearest neighbor processor operating in a constant time as a function of said fixed size and irrespective of a size of said dataset.

2. The method according to claim 1 and comprising implementing a SoftMax unit within said associative memory array to operate on said K keys to produce a query result.

3. The method according to claim 1 and wherein said distance is defined by a type of machine learning operation to be performed on the K keys.

4. The method according to claim 3 and wherein said machine learning operation is one of vector generation and classification.

5. A method for machine learning, the method comprising:
    using a neural network, generating training feature sets that capture similarities between pairs of training inputs associated with a same object;
    storing said feature sets in columns of an associative memory array, wherein each set of said feature sets has a fixed size; and
    activating multiple rows of said associative memory array to implement a search in said columns of said associative memory array storing said feature sets, said search operating in a constant time as a function of said fixed size and irrespective of the number of said feature sets.

6. The method according to claim 5 and comprising implementing a SoftMax unit within said associative memory array to operate on K feature sets to produce a query result.

7. The method according to claim 6 wherein a distance between any two keys corresponding to two similar inputs is smaller than a distance between any two feature sets corresponding to two dissimilar inputs, and wherein said distance is defined by a type of machine learning operation to be performed on the K feature sets.

8. The method according to claim 7 and wherein said machine learning operation is one of vector generation and classification.

\* \* \* \* \*